United States Patent
Badami et al.

(10) Patent No.: US 7,561,027 B2
(45) Date of Patent: Jul. 14, 2009

(54) SENSING DEVICE

(75) Inventors: Kais Kaizar Badami, Singapore (SG); James K. Koch, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 345 days.

(21) Appl. No.: 11/552,983

(22) Filed: Oct. 26, 2006

(65) Prior Publication Data

US 2008/0100434 A1    May 1, 2008

(51) Int. Cl.
*G08B 3/00* (2006.01)
(52) U.S. Cl. .................................... 340/330
(58) Field of Classification Search .......... 340/330, 340/533, 584, 522, 664, 539.27, 636.13; 327/512
See application file for complete search history.

(56) References Cited

U.S. PATENT DOCUMENTS

| | | | |
|---|---|---|---|
| 4,406,550 A * | 9/1983 | Gray | 374/110 |
| 4,448,549 A | 5/1984 | Hashimoto et al. | |
| 4,627,742 A * | 12/1986 | Sakamoto et al. | 374/109 |
| 6,255,892 B1 | 7/2001 | Gartner et al. | |
| 6,512,340 B1 | 1/2003 | Chiu | |
| 6,554,469 B1 | 4/2003 | Thomson et al. | |
| 6,567,763 B1 | 5/2003 | Javanifard et al. | |
| 6,674,185 B2 * | 1/2004 | Mizuta | 307/651 |
| 6,717,530 B1 | 4/2004 | Schmidt et al. | |
| 6,867,470 B1 | 3/2005 | Lorenz | |
| 6,983,603 B2 * | 1/2006 | Macchia | 60/772 |

* cited by examiner

Primary Examiner—Phung Nguyen

(57) ABSTRACT

A sensing device is provided. The sensing device includes two or more sensors for sensing one or more physical properties. A first sensor draws a first electrical signal, and similarly, a second sensor draws a second electrical signal. The first and second electrical signals correspond to values of the physical properties sensed by the respective first and second sensors. The sensing device further includes an electrical circuit connected to the first and second sensors. The electrical circuit draws a third electrical signal. The electrical circuit is configured such that the total electrical signal drawn by the sensing device is proportional to either the first or the second electrical signal, whichever has a higher value.

19 Claims, 3 Drawing Sheets

SENSING DEVICE

FIELD OF THE INVENTION

The invention relates generally to sensing devices, and more particularly, to a sensing device for generating an output signal which is proportional to an input having the highest value obtained from two or more sensors.

BACKGROUND OF THE INVENTION

A MAX function can be described using the following expression:

$$\mathrm{MAX}(a, b) = a, \text{ if } a > b, \text{ or}$$
$$b, \text{ if } b \geq a,$$

where a and b are inputs. In particular, the output of the MAX function is equal to a if the value of a is greater than b, and the output is equal to b if the value of b is equal or greater than a.

Circuits implementing the MAX function are commonly used in applications to sense inputs corresponding to one or more physical properties and generate an output signal which corresponds to the highest value of the inputs. Examples of physical properties include, but not limited to, temperature, humidity, length and pressure. The physical properties may be sensed using suitable sensors which translate values of the physical properties to electrical signals such as current or voltage.

An example of an application of a circuit implementing the MAX function is monitoring heat produced by electrical circuits in electrical appliances. As operating frequencies and transistor densities continue to increase, the heat produced is able to permanently damage the electrical components in the electric circuits. Therefore, many electrical appliances have temperature sensors in them to monitor the amount of heat produced, and to reduce the heat if the temperature exceeds a certain value. When the temperature detected by the temperature sensors exceeds a certain value, the circuit may increase fan speed though additional circuitries or decrease the operating frequencies of any microprocessors to reduce the amount of heat produced.

In some electrical appliances such as networking products, the electrical circuits may be large, and hence, have different thermal characteristics at different points. Therefore, two temperature sensors can be used to sense temperature at two different parts of the appliances. The need to increase fan speed or other measures to reduce ambient temperature is determined based on the higher of the two temperature sensed by the temperature sensors.

A conventional method of generating the MAX function is to use sensors to generate input voltages corresponding to the values of the physical property such as temperature. A bank of rectifier diodes is subsequently used to generate an analog output voltage that is equal to the highest input voltage. This method requires that both inputs be voltage sources with a magnitude significantly higher than the forward voltage drop of the rectifier diodes. Another method is to use an analog multiplexer and an A/D converter followed by a microcontroller. This method is complex, and again, requires the inputs to be voltage sources.

SUMMARY OF THE INVENTION

In an embodiment, a sensing device is provided. The sensing device includes two or more sensors for sensing one or more physical properties. A first sensor draws a first electrical signal, and similarly, a second sensor draws a second electrical signal. The first and second electrical signals correspond to values of the physical properties sensed by the respective first and second sensors. The sensing device further includes an electrical circuit connected to the first and second sensors. The electrical circuit draws a third electrical signal. The electrical circuit is configured such that the total electrical signal drawn by the sensing device is proportional to either the first or the second electrical signal, whichever has a higher value.

BRIEF DESCRIPTION OF THE DRAWINGS

The embodiments of the invention will be better understood in view of the following drawings and the detailed description.

DETAILED DESCRIPTION OF THE INVENTION

Figure 1:
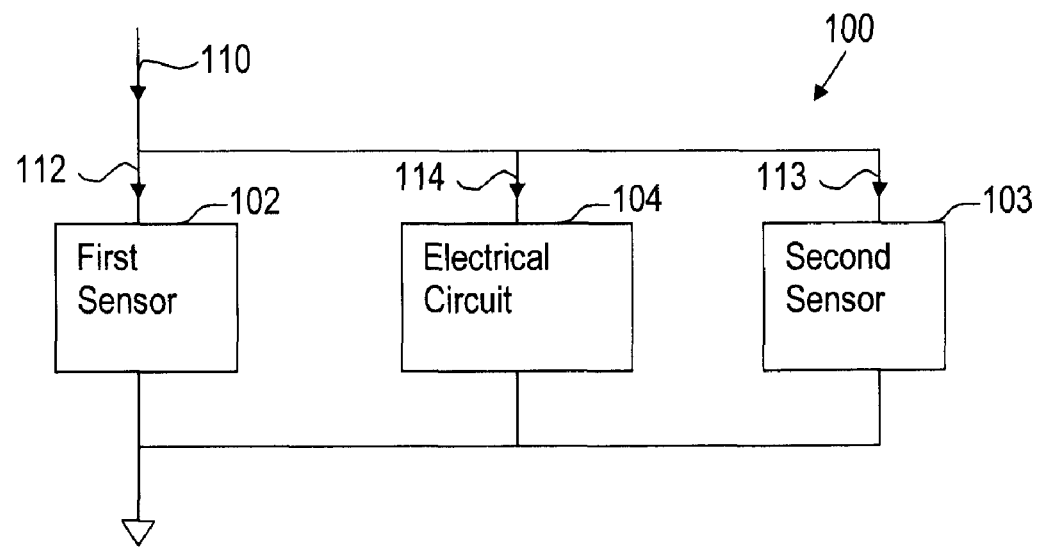
FIG. 1 shows a block diagram of a sensing device according to an embodiment.

FIG. 1 shows a block diagram of a sensing device 100 according to an embodiment. The sensing device 100 includes a first sensor 102, a second sensor 103 and an electrical circuit 104. The electrical circuit 104 is connected to both the first sensor 102 and the second sensor 103.

The first sensor 102 and the second sensor 103 draw a first electrical signal 112 and a second electrical signal 113, respectively. The first and second electrical signals 112, 113 correspond to values of one or more physical properties sensed by the first and second sensor 102, 103 respectively. The electrical circuit 104 draws a third electrical signal 114. The electrical circuit 104 is adapted to draw the third electrical signal 114 such that the total electrical signal 110 drawn by the sensing device 100 is proportional to either the first electrical signal 112 or the second electrical signal 113, whichever has a higher value.

In an embodiment, the electrical signals 112, 113, 114 drawn by the sensors 102, 103 and the electrical circuit 104 are current signals. In this embodiment, the electrical circuit 104 is constructed in such a way that the total current 110 drawn by the sensing device 100 is always proportional to the current 112, 113 having a higher value. For example, if the first sensor 102 senses a higher value than the second sensor 103, the first sensor 102 draws a larger current 112. Accordingly, the total current 110 drawn, is proportional to the current 112 drawn by the first sensor 102.

Figure 2:
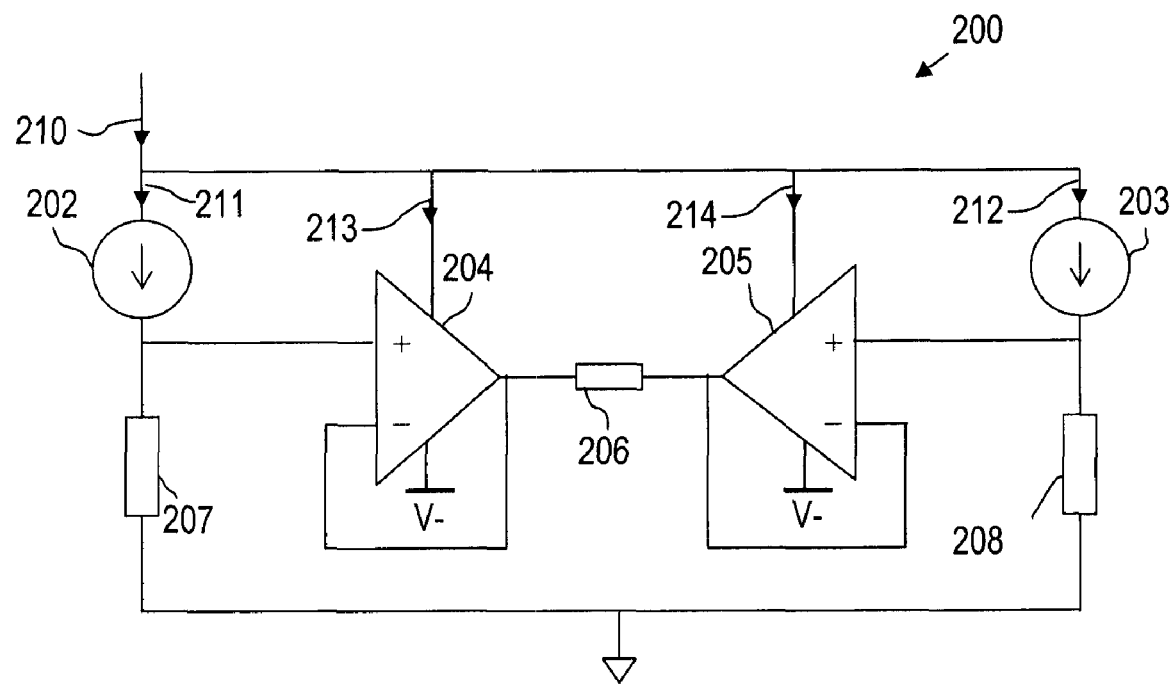
FIG. 2 shows a circuit layout implementation of the sensing device according to an embodiment.

FIG. 2 shows a sensing circuit 200, which is a possible circuit layout implementation of the sensing device 100, according to an embodiment. The first and second sensors 102, 103 are represented using a first current source 202 and a second current source 203. The first and second current sources 202, 203 draw a first and second input current 211, 212, respectively. The electrical circuit 104 is implemented using a first and a second operational amplifier (op amp) 204, 205. A control resistor 206 is connected between the output terminals of the first and second op amps 204, 205. The circuit also includes a first and second resistor 207, 208 connected in series with the first and second current sources 202, 203, respectively.

Each of the op amps 204, 205 are connected in a voltage-follower configuration, that is, the inverting-input terminal of each op amp is connected to its output terminal. The first and second op amps 204, 205 draw a first and second amplifier current 213, 214. It can thus be seen that the total current 210 drawn by the sensing circuit 200 is equal to the sum of the first input current 211, the second input current 212, the first amplifier current 213 and the second amplifier current 214.

According to an embodiment, the first and second op amps 204 and 205 are chosen and configured such that the sum of the first and second amplifier currents 213, 214 is equal to the difference between the first and second input currents 211, 212. In other words:

$$I_{out} = I_1 + I_2 + I_{op1} + I_{op2} \quad (1)$$
$$= I_1 + I_2 + |I_1 - I_2|$$
$$= 2I_1, \text{ if } I_1 > I_2, \text{ or}$$
$$= 2I_2, \text{ if } I_2 \geq I_1.$$

where $I_{out}$ is the total current 210 drawn by the sensing circuit 200, $I_1$ is the first input current 211, $I_2$ is the second input current 212, $I_{op1}$ is the first amplifier current 213, and $I_{op2}$ is the second amplifier current 214. Thus, the total current drawn 210 is equal to the larger of the first and second input currents 211, 212 scaled by a factor of 2:

$$I_{out} = 2 * MAX(I_1, I_2) \quad (2)$$

According to the embodiment, the circuit in FIG. 2 draws a current which is proportional to the larger of two input currents. Such a MAX function realized by the circuit of FIG. 2 can be used in a wide variety of control and analytical systems. Examples of such systems include, but not limited to:
 (a) An electronic cooling system which has two temperature sensors. The cooling system responds to the sensor which corresponds to a higher temperature.
 (b) An audio system which has two microphones. The signal fed to an amplifier of the audio system is the larger of the two microphone signals.
 (c) A process control system which has a pressure sensor and a velocity sensor. The speed of a motor in the control system is controlled by the sensor which corresponds to a higher output.

Figure 3:
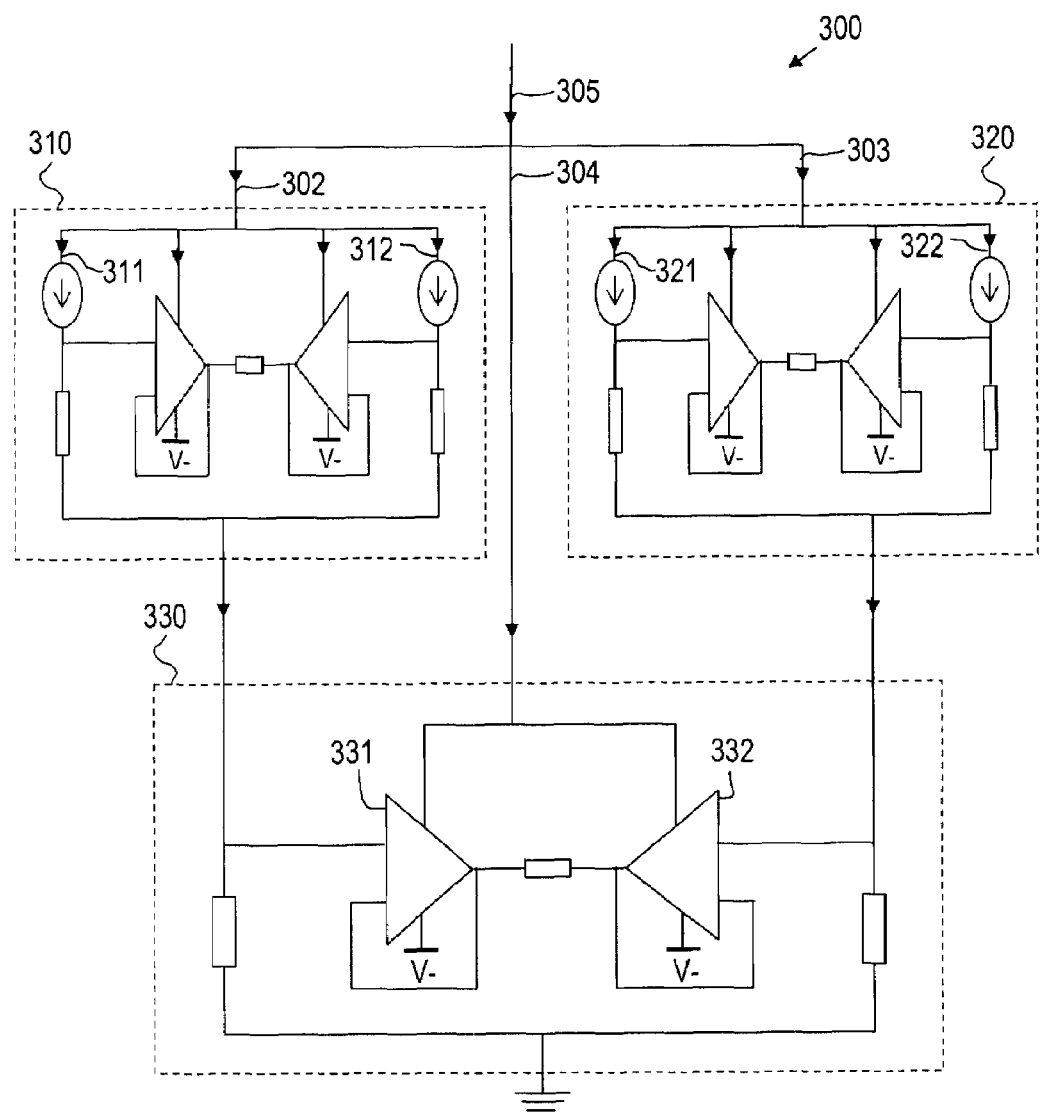
FIG. 3 shows a cascaded sensing device for sensing four inputs according to an embodiment.

FIG. 3 shows a cascaded sensing circuit 300 for obtaining inputs corresponding to four sensors according to an embodiment. The cascaded sensing circuit 300 includes a first sensing circuit 310, a second sensing circuit 320 and a third sensing circuit 330. The total current 305 drawn by the cascaded sensing circuit 300 includes a first supply current 302 drawn by the first sensing circuit 310, a second supply current 303 drawn by the second sensing circuit 320, and an amplifier supply current 304 drawn by the third sensing circuit 330 for supplying power to the two op amps 331, 332 of the third sensing circuit 330.

The first supply current 302 drawn by the first sensing circuit 310 can be expressed using the following expression as already determined in FIG. 2:

$$I_{sc1} = 2*MAX(I_{in1}, I_{in2}), \quad (3)$$

where $I_{sc1}$ is the first supply current 302, and $I_{in1}$ and $I_{in2}$ are input currents 311, 312 drawn by a first and second sensor of the cascaded sensing circuit 300. Similarly, the second supply current 303 can be expressed using the following expression:

$$I_{sc2} = 2*MAX(I_{in3}, I_{in4}), \quad (4)$$

where $I_{sc2}$ is the second supply current 303, and $I_{in3}$ and $I_{in4}$ are input currents 321, 322 of a third and fourth sensor.

The total current 305 drawn by the cascaded sensing circuit 300 can be represented using the following expression:

$$I_{total} = 2*MAX(I_{sc1}, I_{sc2}) \quad (5)$$
$$= 2*MAX(2*MAX(I_{in1}, I_{in2}), 2*MAX(I_{in3}, I_{in4}))$$
$$= 4*MAX(I_{in1}, I_{in2}, I_{in3}, I_{in4})$$

where $I_{total}$ is the total current 305. It can be seen that the total current 305 is proportional the largest of the four input currents 311, 312, 321, 322.

Figure 4:
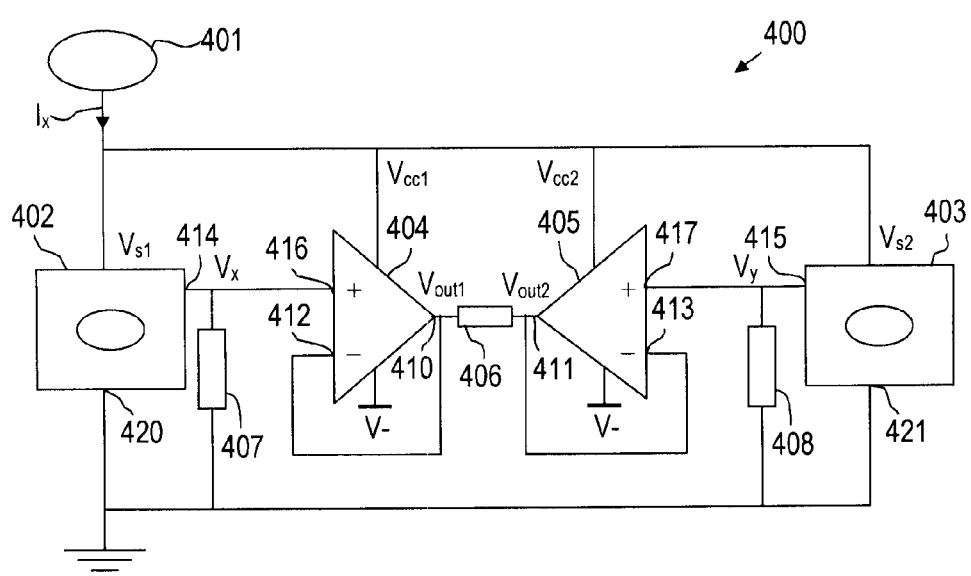
FIG. 4 shows an example of a circuit layout implementation of a temperature sensing device for sensing temperature according to an embodiment.

FIG. 4 shows an example of an implementation of the sensing device 100 as a temperature sensing device 400 according to an embodiment. In this example, the first and second temperature sensors 402, 403 are implemented using LM35 National Semiconductor temperature sensors. It should be noted that other temperature sensors, for example, LM 75 from National Semiconductor or MAX 6605 from Maxim, may also be used in this example. The LM35 temperature sensor typically includes a power supply pin for connecting to a power supply, a voltage output pin for outputting an output voltage indicative of temperature, and a GND pin for connecting to Ground.

The electrical circuit 104 is implemented using a first and second op amp 404, 405 and a resistor 406. An example of a suitable op amp used in this example includes the TS932IDT op amp from STMicroelectronics. The op amp typically includes a positive and negative power supply terminals for connecting to a power supply to power up the op amp, a non-inverting input terminal, an inverting input terminal and an output terminal. The output of the op amp is a "push-pull" type where output current flowing from the output terminal is the current supplied to the positive power supply terminal, and output current flowing into the output terminal of the op amp is directed to the negative power supply terminal.

The power supply pins $V_{s1}$, $V_{s2}$ of the first and second temperature sensors 402, 403 and the positive power supply terminals $V_{cc1}$, $V_{cc2}$ of the first and second op amps 404, 405 are connected to a load device 401. Collectively, they draw a total current $I_x$ from the load device 401.

Each of the op amps 404, 405 is connected in the voltage follower configuration, with the output terminals 410, 411 of the op amps 404, 405 connected to their respective inverting input terminals 412, 413. The voltage output pin 414 of the first temperature sensor 402 is connected to the non-inverting input terminal 416 of the first op amp 404, and the voltage output pin 415 of the second temperature sensor 403 is connected to the non-inverting input terminal 417 of the second op amp 405.

The resistor 406 is connected between the output terminals 410, 411 of the first and second op amps 404, 405. When there is a difference in the output voltage $V_{out1}$, $V_{out2}$ of the op amps 404, 405, current flows through the resistor 406 to maintain a voltage drop. Accordingly, the resistance value of the resistor 406 may be selected to control the current flowing through it.

The temperature sensing device 400 includes a first sensing resistor 407 connected between the voltage output pin 414 and the GND pin 420 of the first temperature sensor 402, and a second sensing resistor 408 connected between voltage output pin 415 and the GND pin 421 of the second temperature sensor 403. The current drawn by the first temperature sensor 402 is the sum of its quiescent current and the current through the first sensing resistor 407:

$$I_1 = I_{q1} + I_{R1} \tag{6}$$

where $I_1$ is the current drawn by the first temperature sensor 402, $I_{q1}$ is the quiescent current of the first temperature sensor 402 and $I_{R1}$ is the current through the first sensing resistor 407. The resistance of the first sensing resistor 407 is chosen such that the current flowing through it is very large compared to its quiescent current:

$$I_{R1} = V_x/R1 >> I_{q1} \tag{7}$$

where R1 is the first sensing resistor 407. In this way the current drawn by the first temperature sensor 402 is approximately proportional to temperature.

Similarly, the current drawn by the second temperature sensor 403 is the sum of its quiescent current and the current through the second sensing resistor 408:

$$I_2 = I_{q2} + I_{R2} \tag{8}$$

where $I_2$ is the current drawn by the second temperature sensor 403, $I_{q2}$ is the quiescent current of the second temperature sensor 403 and $I_{R2}$ is the current through the second sensing resistor 408. The resistance of the second sensing resistor 408 is chosen such that the current flowing through it is very large compared to its quiescent current:

$$I_{R2} = V_y/R2 >> I_{q2} \tag{9}$$

where R2 is the second sensing resistor 408.

The operations of the temperature sensing device 400 as shown in FIG. 4 shall now be described in detail according to an embodiment. In this embodiment, it is assumed that the quiescent current consumed by the temperature sensors 402, 403 and the op amps 404, 405 are small compared to the current through the respective resistors 406, 407, 408.

All the resistors 406, 407, 408 are selected to be of the same resistance value R. Let the voltage across the first and second temperature sensors 402, 403 be $V_x$ and $V_y$, respectively. The total current $I_x$ drawn from the load device 401 is:

$$I_x = I_1 + I_2 + I_3 \tag{10}$$

where $I_1$ is the current drawn by the first temperature sensor 402;
$I_2$ is the current drawn by the second temperature sensor 403; and
$I_3$ is the current drawn by the op amps 404, 405. In operation, the current drawn by one of the op amps 404, 405 will be close to zero.

When the temperature sensed by the first temperature sensor 402 is higher than the temperature sensed by the second temperature sensor 403, the output voltage $V_x$ of the first temperature sensor 402 is higher than the output voltage $V_y$ of the second temperature sensor 403. Accordingly, the output voltage $V_{out1}$ of the first op amp 404 is higher than the output voltage $V_{out2}$ of the second op amp 405. Therefore, $I_3$ flows through the first op amp 404, across the resistor 406 and is sinked through the second op amp 405. Equation (10) becomes:

$$I_x = V_x/R + V_y/R + (V_{out1} - V_{out2})/R \tag{11}$$

Since $V_{out1} = V_x$ and $V_{out2} = V_y$, $$I_x = V_x/R + V_y/R + (V_x - V_y)/R = 2V_x/R \tag{12}$$

When the temperature sensed by the second temperature sensor 403 is higher than the temperature sensed by the first temperature sensor 402, the output voltage $V_y$ of the second temperature sensor 403 is higher than the output voltage $V_x$ of the first temperature sensor 402. Accordingly, the output voltage $V_{out2}$ of the second op amp 405 is higher than the output voltage $V_{out1}$ of the first op amp 404. Therefore, $I_3$ flows through the second op amp 405, across the resistor 406 and is sinked through the first op amp 404. Equation (10) becomes:

$$I_x = V_x/R + V_y/R + (V_{out2} - V_{out1})/R \tag{13}$$

and therefore, $$I_x = V_x/R + V_y/R + (V_y - V_x)/R = 2V_y/R \tag{14}$$

When the temperature sensed by both the first and second temperature sensor 402, 403 is the same, the output voltage $V_{out1}$ of the first op amp 404 is the same as the output voltage $V_{out2}$ of the second op amp 405. In this case, no current is dawn by any of the op amps 406, 407. Equation (10) becomes $$I_x = V_x/R + V_y/R = 2V_x/R \text{ or } 2V_y/R \tag{15}$$

Therefore, it can be seen that the total current $I_x$ is always proportional to the current drawn by the temperature sensor 402, 403 which senses a higher temperature. Accordingly, the temperature sensing device 400 according to the embodiment is able to continuously draw a current which is proportional to the higher of the two temperatures sensed by the two temperature sensors. In other words, the readings given by the temperature sensing device is continuous. There is no "evaluation delay" which is present when using a digital circuit to poll and compute which of the two temperature sensors is higher, and subsequently drawing a current which is proportional to the higher of the two temperatures.

It should be noted that the devices used in the temperature sensing device 400 described above are only examples. It is possible to use other devices to implement the sensing device 100 according to other embodiments. It should be noted that op amps which are suitable to be used in the electrical circuit 104 satisfy the following requirements:

a) the quiescent current of the op amp is much smaller than its output current;
b) the inputs and output of the op amp have voltage ranges that are suitable to be used according to operation conditions determined by the power supply voltage;
c) the current flowing from output terminal of the op amp is the current flowing into the positive power supply terminal; and
d) the current flowing into the output terminal is conducted out of the op amp through the negative power supply terminal.

Although the present invention has been described in accordance with the embodiments as shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A sensing device comprising:
   at least a first and a second sensor for sensing at least one physical property and drawing a first and a second electrical signal respectively, the first and second electrical signals corresponding to values of the at least one physical property sensed by the respective first and second sensors; and
   an electrical circuit connected to the first and second sensors, the electrical circuit drawing a third electrical signal,
   wherein the electrical circuit is configured such that the total electrical signal drawn by the sensing device is proportional to either the first or the second electrical signal, whichever has a higher value, and
   wherein the electric circuit comprises a first operational amplifier and a second operational amplifier, and wherein the first and the second operational amplifiers are arranged in a voltage follower configuration.

2. The sensing device of claim 1, wherein the electrical signal is a current signal.

3. The sensing device of claim 1, wherein the electrical circuit is configured in a manner such that the third electrical signal is equal to the difference between the first and second electrical signal.

4. The sensing device of claim 1, wherein the third electrical signal is drawn by the first operational amplifier and the second operational amplifier for supplying power thereof.

5. The sensing device of claim 4, wherein the first operational amplifier and the second operational amplifier uses an operational amplifier which has the following properties:
   an electrical signal flowing into a positive power supply terminal of the operational amplifier is substantially the same as the electrical signal flowing from an output terminal of the operational amplifier; and
   an electrical signal flowing into the output terminal of the operational amplifier is substantially the same as the electrical signal flowing from a negative power supply terminal of the operational amplifier.

6. The sensing device of claim 5, further comprising a resistor between the output terminals of the operational amplifiers for controlling the third electrical signal.

7. The sensing device of claim 1, wherein the physical property sensed by the first sensor and the second sensor is temperature.

8. The sensing device of claim 7, wherein the first and second sensors are temperature sensors.

9. A sensing device comprising:
   at least a first and a second sensor for sensing at least one physical property and drawing a first and a second current respectively from a load, the first and second currents corresponding to values of the at least one physical property sensed by the respective first and second sensors; and
   an electrical circuit connected to the first and second sensors, the electrical circuit drawing a third current from the load,
   wherein a total current drawn by the sensing device from the load is proportional to either the first or the second electrical signal, whichever has a higher value.

10. The sensing device of claim 9, wherein the at least one physical property comprises one of heat, humidity and pressure.

11. The sensing device of claim 9, wherein the electrical circuit is configured in a manner such that the third current is equal to the difference between the first and second currents.

12. The sensing device of claim 9, wherein the third current is drawn by the first operational amplifier and the second operational amplifier for supplying power thereof.

13. The sensing device of claim 12, wherein the first operational amplifier and the second operational amplifier uses an operational amplifier which has the following properties:
   an electrical signal flowing into a positive power supply terminal of the operational amplifier is substantially the same as the electrical signal flowing from an output terminal of the operational amplifier; and
   an electrical signal flowing into the output terminal of the operational amplifier is substantially the same as the electrical signal flowing from a negative power supply terminal of the operational amplifier.

14. The sensing device of claim 13, further comprising a resistor between the output terminals of the operational amplifiers for controlling the third current.

15. The sensing device of claim 9, wherein the physical property sensed by the first sensor and the second sensor is temperature.

16. A sensing device comprising:
   at least a first and a second sensor for sensing at least one physical property and drawing a first and a second electrical signal respectively, the first and second electrical signals corresponding to values of the at least one physical property sensed by the respective first and second sensors; and
   an electrical circuit connected to the first and second sensors, the electrical circuit drawing a third electrical signal,
   wherein the electrical circuit is configured such that the total electrical signal drawn by the sensing device is a multiple X of either the first or the second electrical signal, whichever has a higher value, wherein X is an integer greater than 1.

17. The sensing device of claim 16, wherein the electrical signal is a current signal.

18. The sensing device of claim 16, wherein the electrical circuit is configured in a manner such that the third electrical signal is equal to the difference between the first and second electrical signal.

19. The sensing device of claim 16, wherein the third electrical signal is drawn by the first operational amplifier and the second operational amplifier for supplying power thereof.

* * * * *